US012600567B2

(12) United States Patent
Austrheim et al.

(10) Patent No.: US 12,600,567 B2
(45) Date of Patent: Apr. 14, 2026

(54) CONTAINER HANDLING VEHICLE WITH EXTENDABLE WHEEL BASE

(71) Applicant: Autostore Technology AS, Nedre Vats (NO)

(72) Inventors: Trond Austrheim, Etne (NO); Øystein Gjerdevik, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 638 days.

(21) Appl. No.: 18/003,591

(22) PCT Filed: Jul. 8, 2021

(86) PCT No.: PCT/EP2021/069022
§ 371 (c)(1),
(2) Date: Dec. 28, 2022

(87) PCT Pub. No.: WO2022/008670
PCT Pub. Date: Jan. 13, 2022

(65) Prior Publication Data
US 2023/0234780 A1      Jul. 27, 2023

(30) Foreign Application Priority Data

Jul. 10, 2020      (NO) .................................. 20200818

(51) Int. Cl.
*B65G 1/04*            (2006.01)
*B65G 1/06*            (2006.01)
(Continued)

(52) U.S. Cl.
CPC .......... *B65G 1/065* (2013.01); *B65G 1/0464* (2013.01); *B65G 1/0478* (2013.01); *B65G 57/03* (2013.01);
(Continued)

(58) Field of Classification Search
CPC .... B65G 1/065; B65G 1/0464; B65G 1/0478; B65G 57/03; B65G 59/02; G05B 19/41895; G06Q 10/087
See application file for complete search history.

(56) References Cited

U.S. PATENT DOCUMENTS

2016/0194151 A1*  7/2016  Lindbo ................ B65G 1/0464
2018/0178980 A1*  6/2018  Lindbo .................. G06Q 10/08
(Continued)

FOREIGN PATENT DOCUMENTS

CN          206476386 U      9/2017
CN          109591534 A      4/2019
(Continued)

OTHER PUBLICATIONS

Schneider, Marc, Office Action in EP21740511.7, mailed May 21, 2025, 6 pages, European Patent Office, Rijswijk, Netherlands.
(Continued)

*Primary Examiner* — Thomas Randazzo
(74) *Attorney, Agent, or Firm* — Baker Botts L.L.P.

(57) ABSTRACT

A container handling vehicle with a cantilever solution operates on an automated storage and retrieval system. The automated storage and retrieval system includes a framework structure forming a three-dimensional storage grid structure for storing storage containers for storing items. The grid structure forms vertical storage columns each having a horizontal area defined by the size of an access opening of the vertical storage columns. A rail system is arranged on the framework structure, rails of the rail system extending in an X-direction and a Y-direction to define a grid and to define a perimeter of each access opening on top of each storage column. The rail system provides available routes for container handling vehicles handling and transferring the storage containers to and from the storage columns. Each rail has a first track and a parallel second track allowing two (Continued)

container handling vehicles to pass each other using the same rail. Each vehicle communicates with a central computer system controlling the operation. At least one container handling vehicle has a container handling platform with a set of grippers for handling the storage containers. The wheels are on a cantilever side of the container handling vehicle, used for manoeuvring the container handling vehicle in the Y-direction, are positioned or are positionable with respect to the container handling vehicle to allow them to use an outer track of a rail in the Y-direction to manoeuvre the container handling vehicle when the wheels on an opposite side of the container handling vehicle are using an inner track of an adjacent rail in the Y-direction.

10 Claims, 8 Drawing Sheets

(51) Int. Cl.
| | |
|---|---|
| *B65G 57/03* | (2006.01) |
| *B65G 59/02* | (2006.01) |
| *G05B 19/418* | (2006.01) |
| *G06Q 10/087* | (2023.01) |

(52) U.S. Cl.
CPC ....... *B65G 59/02* (2013.01); *G05B 19/41895* (2013.01); *G06Q 10/087* (2013.01)

(56) References Cited

U.S. PATENT DOCUMENTS

| | | | | |
|---|---|---|---|---|
| 2018/0178981 A1* | 6/2018 | Lindbo | ................ | G06Q 10/087 |
| 2020/0148471 A1* | 5/2020 | Lindbo | ................ | B65G 1/0464 |
| 2020/0307908 A1* | 10/2020 | Lindbo | ................ | B65G 1/0464 |
| 2022/0135324 A1* | 5/2022 | Whelan | ................ | B65G 1/0464 |
| | | | | 414/266 |
| 2022/0371825 A1* | 11/2022 | Gravelle | .............. | G05D 1/0291 |
| 2023/0271785 A1* | 8/2023 | Gravelle | .............. | G06Q 10/087 |

FOREIGN PATENT DOCUMENTS

| | | | |
|---|---|---|---|
| NO | 317366 | B1 | 10/2004 |
| WO | 11119083 | A1 | 9/2011 |
| WO | 14075937 | A1 | 5/2014 |
| WO | 14090684 | A1 | 6/2014 |
| WO | 15019055 | A1 | 2/2015 |
| WO | 15193278 | A1 | 12/2015 |
| WO | 18146304 | A1 | 8/2018 |
| WO | 18206478 | A1 | 11/2018 |
| WO | 2019/101725 | A1 | 5/2019 |
| WO | 2019/137870 | A1 | 7/2019 |

OTHER PUBLICATIONS

Zhu, Simin, Office Action in CN202180048533.5, mailed May 15, 2025, 11 pages, The State Intellectual Property Office of the People's Republic of China, Beijing, China.

International Search Report issued in Application No. PCT/EP2021/069022 mailed on Oct. 22, 2021 (5 pages).

Written Opinion issued in Application No. PCT/EP2021/069022 mailed on Oct. 22, 2021 (10 pages).

Norwegian Search Report issued in Norwegian Application No. 20200818 mailed on Feb. 8, 2021 (2 pages).

Schneider, Marc, Office Action for European Patent Application No. 21740511.7, dated Dec. 11, 2024, 6 pages, pub. by the EPO, Rijswijk Netherlands.

* cited by examiner

CONTAINER HANDLING VEHICLE WITH EXTENDABLE WHEEL BASE

FIELD OF THE INVENTION

The present invention relates to an automated storage and retrieval system for storage and retrieval of containers, in particular to a system and method for improving the stability of a container handling vehicle with a cantilever.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201.301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c.301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c, 301c is arranged to engage with two adjacent rails of the second set 111 of rails. At least one of the sets of wheels 2016,301b,201c.301c can be lifted and lowered, so that the first set of wheels 201b,301b and/or the second set of wheels 201c.301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201.301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1. Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201.301 colliding with each other, the automated storage and retrieval system 1 comprises a control system 500 which typically is computerized and which typically comprises a database for keeping track of the storage containers 106.

There is a problem with the robots using the cantilever solution. The problem is that there is an instability in the robot particularly when the container handling vehicle is carrying a container. This instability is due to the cantilever solution placing the weight of the cantilever part of the robot and the container in relation to the placement of the wheels. The center of gravity of the cantilever and the container is outside the base of the set of wheels. This makes the solution unstable and 30 especially if the container is heavy.

SUMMARY OF THE INVENTION

The present invention is set forth and characterized in the independent claims, while the dependent claims describe other characteristics of the invention.

In one aspect, the invention is related to a container handling vehicle with a cantilever solution operating on an automated storage and retrieval system comprising a framework structure forming a three-dimensional storage grid structure for storing storage containers for storing items, where the grid structure forms vertical storage columns each having a horizontal area defined by the size of an access opening of the vertical storage columns and where a rail system is arranged on the framework structure, rails of the rail system extending in an X-direction and a Y-direction to define a grid and to define a perimeter of each access opening on top of each storage column, the rail system providing available routes for container handling vehicles handling and transferring the storage containers to and from the storage columns, each rail has a first track and a parallel second track allowing two container handling vehicles to pass each other using the same rail, each vehicle communicating with a central computer system controlling the operation, and the at least one container handling vehicle has a container handling platform with a set of grippers for handling the storage containers, wherein the wheels on a cantilever side of the container handling vehicle, used for maneuvering the container handling vehicle in the Y-direction, are positioned or are positionable with respect to the container handling vehicle to allow them to use a second track of a rail in the Y-direction to manoeuvre the container handling vehicle when the wheels on an opposite side of the container handling vehicle are using a first track of an adjacent rail in the Y-direction.

The wheels on the cantilever side of the container handling vehicle are positioned with respect to the container handling vehicle to provide an extension of a wheelbase of the container handling vehicle in the X-direction.

The extension of the wheelbase through the positioning of the wheels on the cantilever side of the container handling vehicle that are used for maneuvering the container handling vehicle in a Y-direction is a permanent extension.

The wheels adjacent to the cantilever side of the container handling vehicle that are used for maneuvering the container handling vehicle in a X-direction are displaceable in the X-direction to provide an extension of a wheelbase in the X-direction for the wheels arranged perpendicular to the cantilever side.

The wheels adjacent to the cantilever side of the container handling vehicle that are used for maneuvering the container handling vehicle in a X-direction are permanently displaced in the X-direction to provide an extension of a wheelbase in the X-direction for the wheels arranged perpendicular to the cantilever side. The extension of the wheelbase is controlled by an electric actuator.

The wheels on the cantilever side of the container handling vehicle that are used for maneuvering the container handling vehicle in a Y-direction are positioned in an extended wheelbase position while the container handling vehicle is set to maneuver in a X-direction.

The wheels on the cantilever side of the container handling vehicle that are used for maneuvering the container handling vehicle in a Y-direction are provided with a double set of wheels on each axel.

Each double set of wheels has one wheel in each of the first and second track of the rail.

The extension of the wheelbase is controlled according to a weight of the container attached to the lifting platform of the container handling vehicle.

The extension of the wheelbase is controlled by the central computer system.

In a second aspect, the invention concerns a method where a container handling vehicle with a cantilever operating on an automated storage and retrieval system comprising a framework structure forming a three-dimensional storage grid structure for storing storage containers for storing items, where the grid structure forms vertical storage columns each having same horizontal area defined by the size of an access opening of the vertical storage columns and where a rail system is arranged on the framework structure, rails of the rail system extending in an X-direction and a Y-direction to define a grid and to define a perimeter of each access opening on top of each storage column, the rail system providing available routes for container handling vehicles handling and transferring the storage containers to and from the storage columns, each rail has a first track and a parallel second track allowing two container handling vehicles to pass each other using the same rail, each vehicle comprising a vehicle controller communicating with a central computer system controlling the operation, and the at least one container handling vehicle has a container handling platform with a set of grippers for handling the storage containers, wherein the wheels on a cantilever side of the container handling vehicle that are used for maneuvering the container handling vehicle in the Y-direction are positionable with respect to the container handling vehicle to allow them to use a second track of a rail in the Y-direction to manoeuvre the container handling vehicle when the wheels on an opposite side of the container handling vehicle are using a first track of an adjacent rail in the Y-direction.

The method comprises the following steps: lowering wheels used for maneuvering the container handling vehicle in a X-direction, lifting the container handling vehicle so the wheels used for maneuvering the container handling vehicle in a Y-direction are lifted from a first track of the rails, repositioning the wheels on a cantilever side of the container handling vehicle that are used for maneuvering the container handling vehicle in a Y-direction, raising the wheels adjacent the cantilever side of the container handling vehicle that are used for maneuvering the container handling vehicle in a X-direction.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
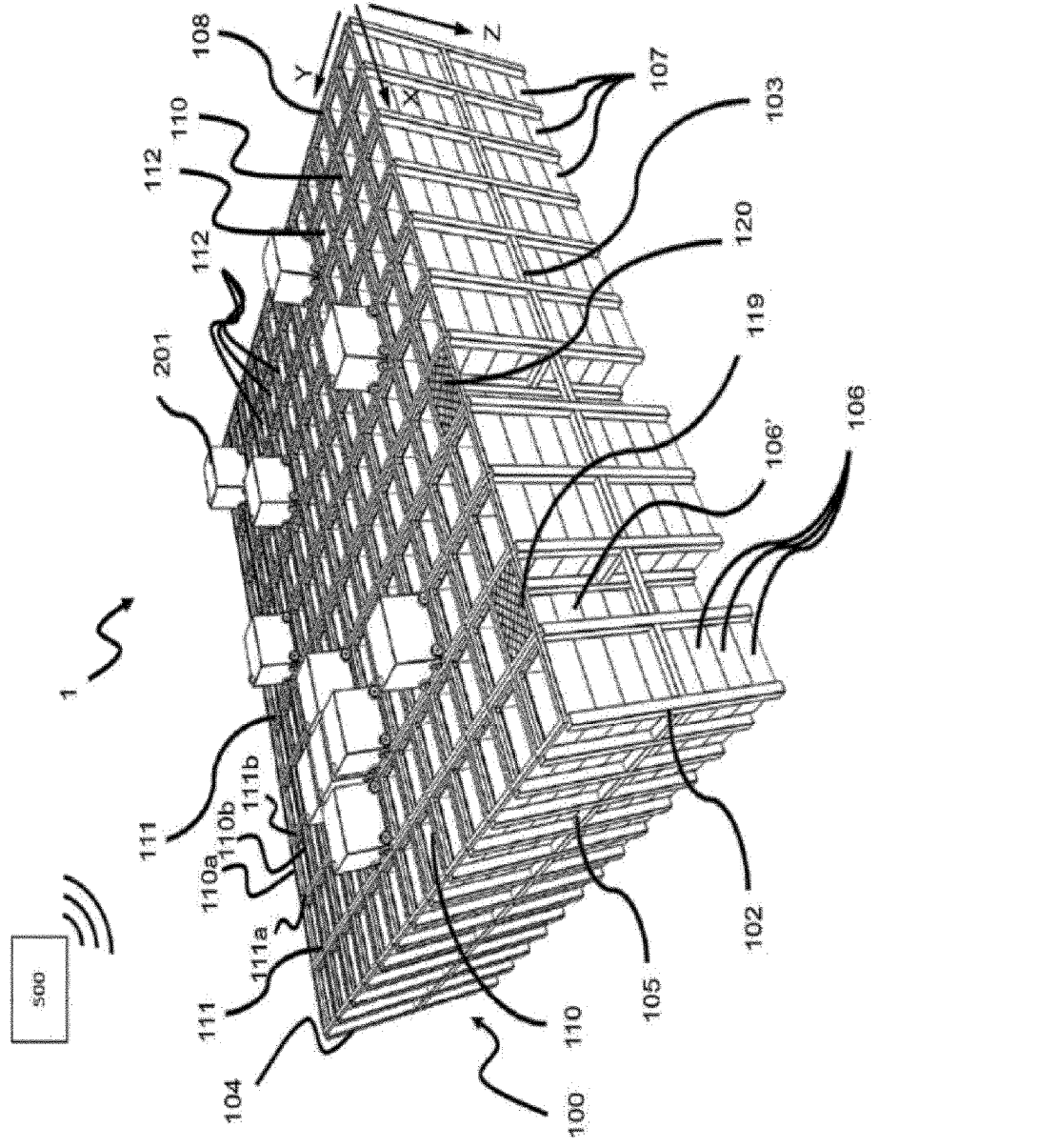
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 2:
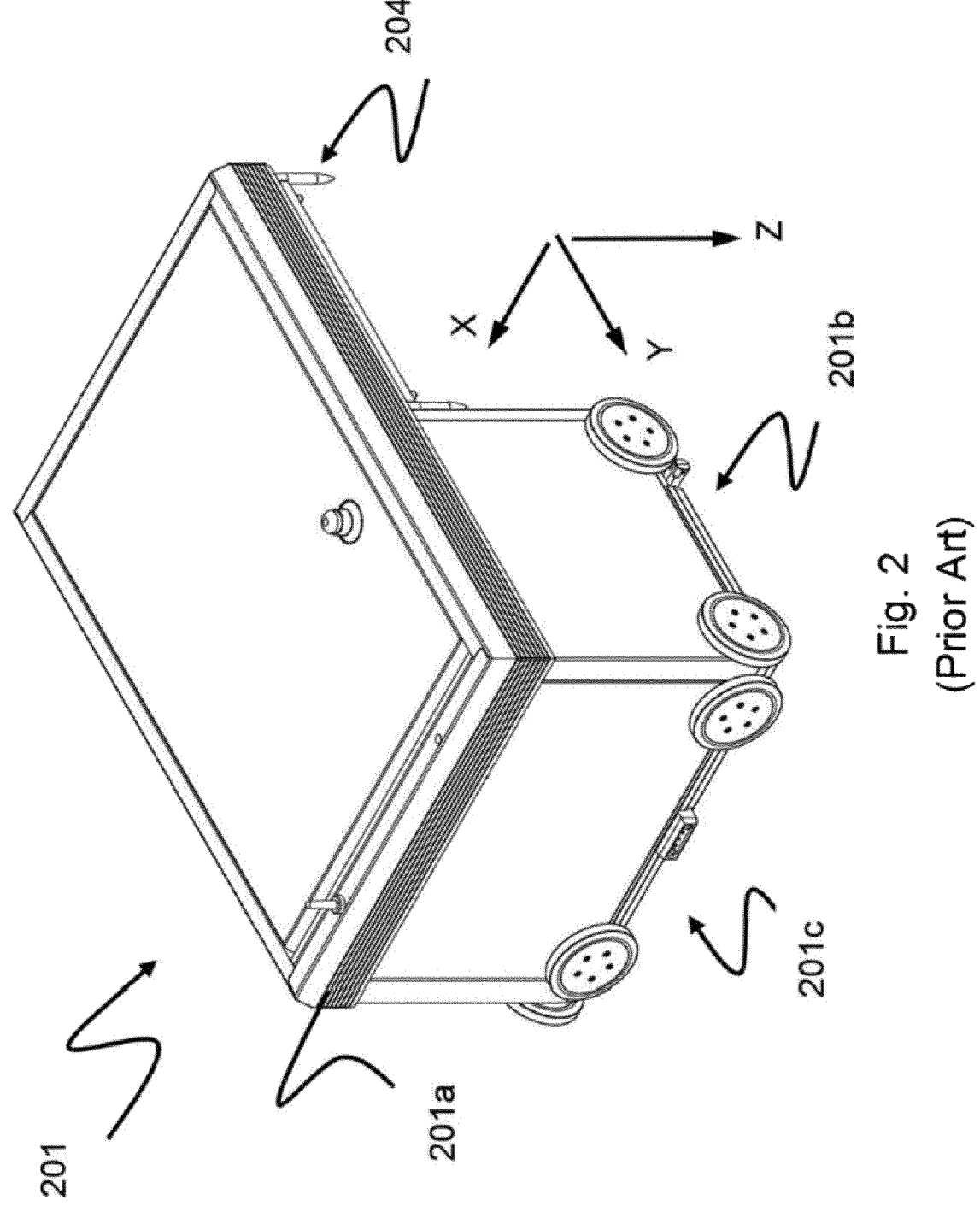
FIG. 2 is a perspective view of a prior art container handling vehicle having a cantilever for carrying storage containers underneath.

FIG. 2 is a perspective view of a prior art container handling vehicle having a cantilever for carrying storage containers underneath.

Each container handling vehicle with a cantilever is comprised of a main body and a cantilever with one part attached to the top of the main body and one part extending out from the main body comprising a lifting platform for handling the containers. There are four sets of wheels on the container handling vehicle. All the wheels are attached to the main body of the container handling vehicle. There are two front wheels and two back wheels in the X-direction and there are two front wheels and two back wheels in the Y-direction. The side of the container handling vehicle where the cantilever is protruding out is to be considered as the front of the vehicle.

Figure 3:
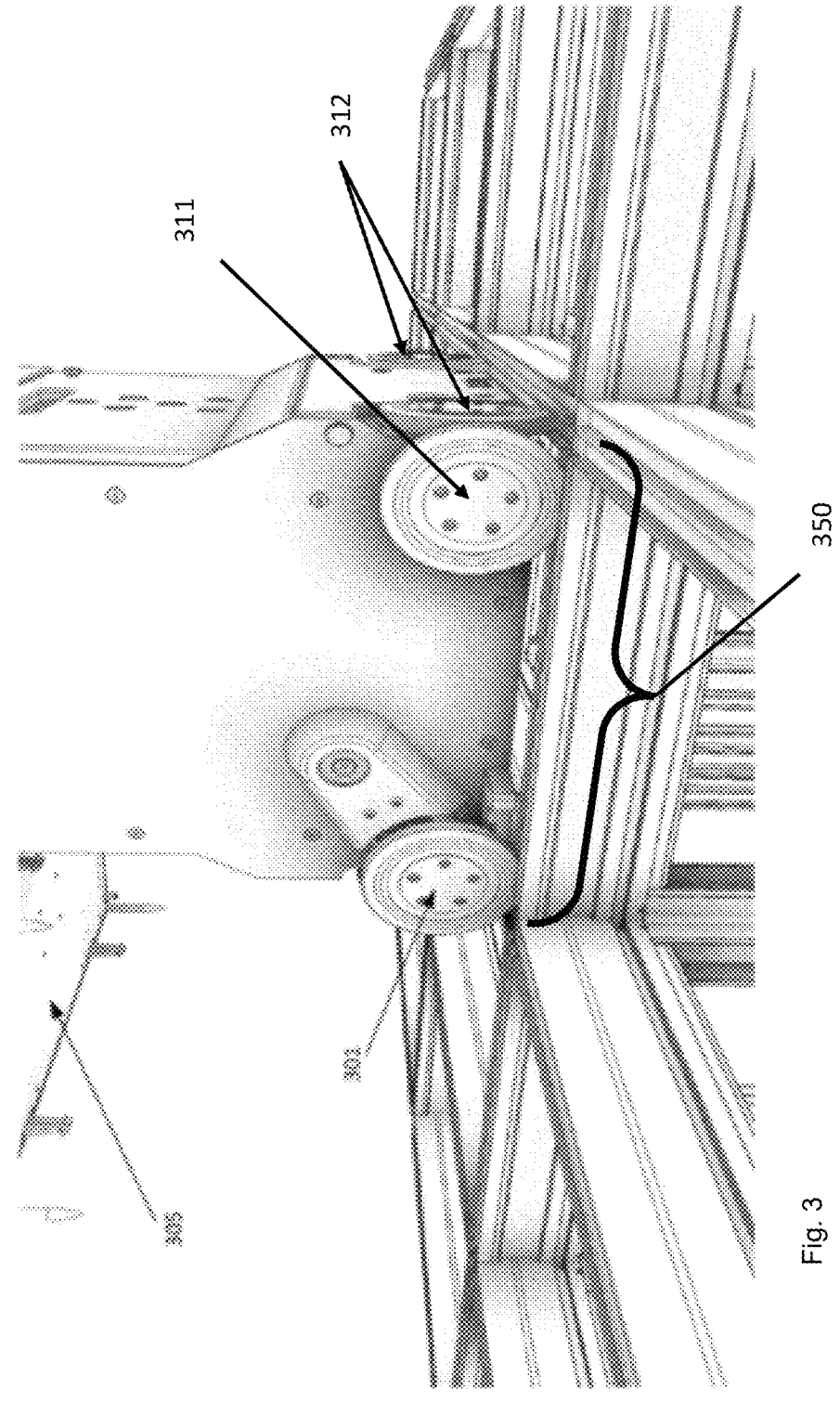
FIG. 3 is a perspective drawing of a container handling vehicle with a cantilever.

FIG. 3 is a perspective drawing of a container handling vehicle with a cantilever. In this solution the lifting platform 305 is raised all the way to the top. The drawing show a container handling vehicle with a cantilever parked over a column in the storage and retrieval system. As shown in the drawing the container handling vehicle takes up more space than one column. The main body is situated over a neighbouring column of the column where the lifting platform is working. Further it can be seen how the wheels of the robot are placed in the tracks closest to the main body of the container handling vehicle. The first wheel in the X-direction on each side of the container handling vehicle is an extendable wheel 301. These extendable wheels 301 can be extended towards the cantilever portion of the container handling vehicle. The extendable wheels are extended along the same set of tracks that they are originally in. By extending these wheels the centre of mass is shifted towards the cantilever. This ensures a more stable container handling vehicle during transportation of heavy containers.

Figure 4:
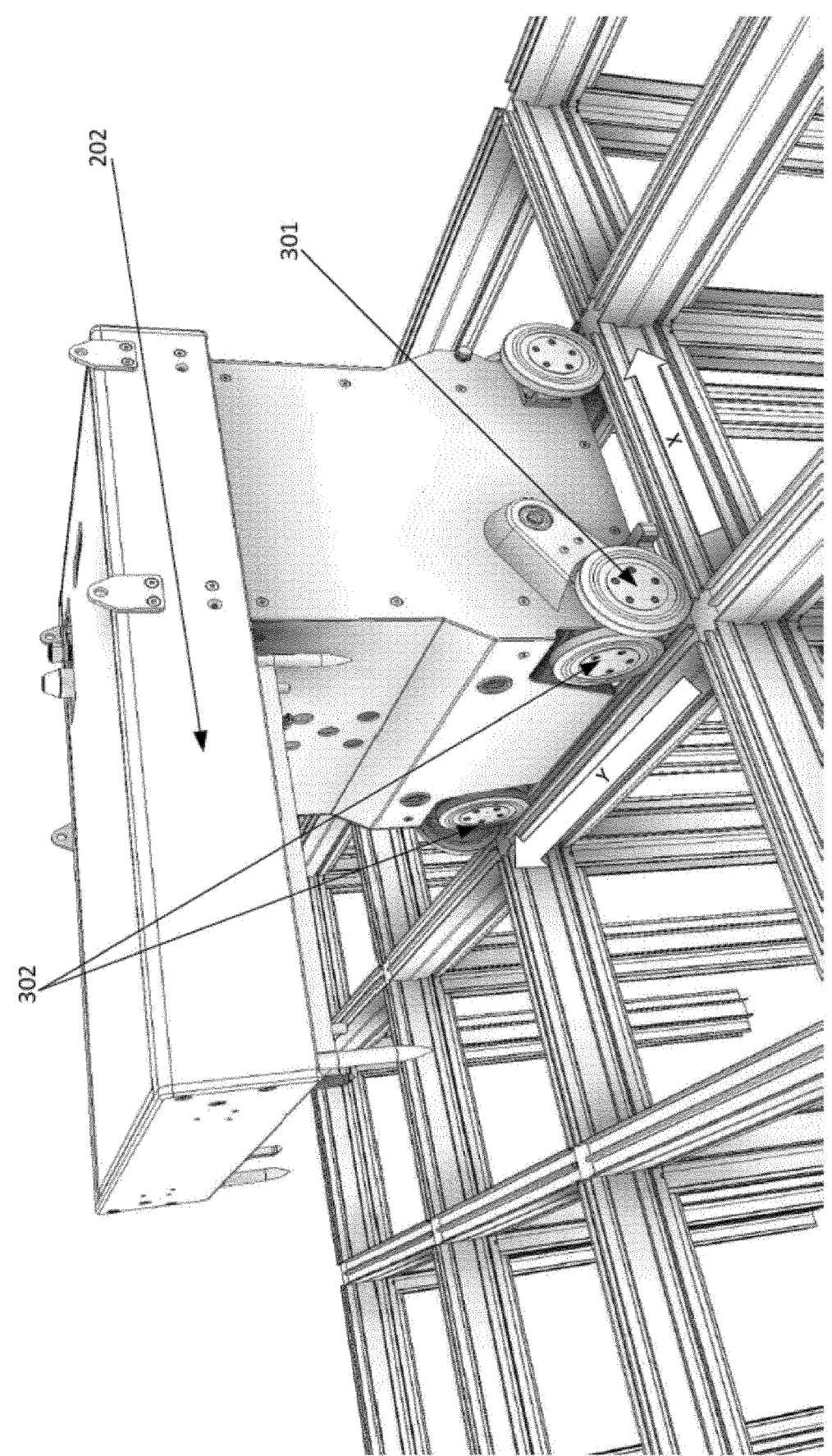
FIG. 4 is a perspective drawing of an embodiment of the present invention showing the container handling vehicle positioned on the storage and retrieval system and wherein the directions X and Y is indicated.
Figure 5:
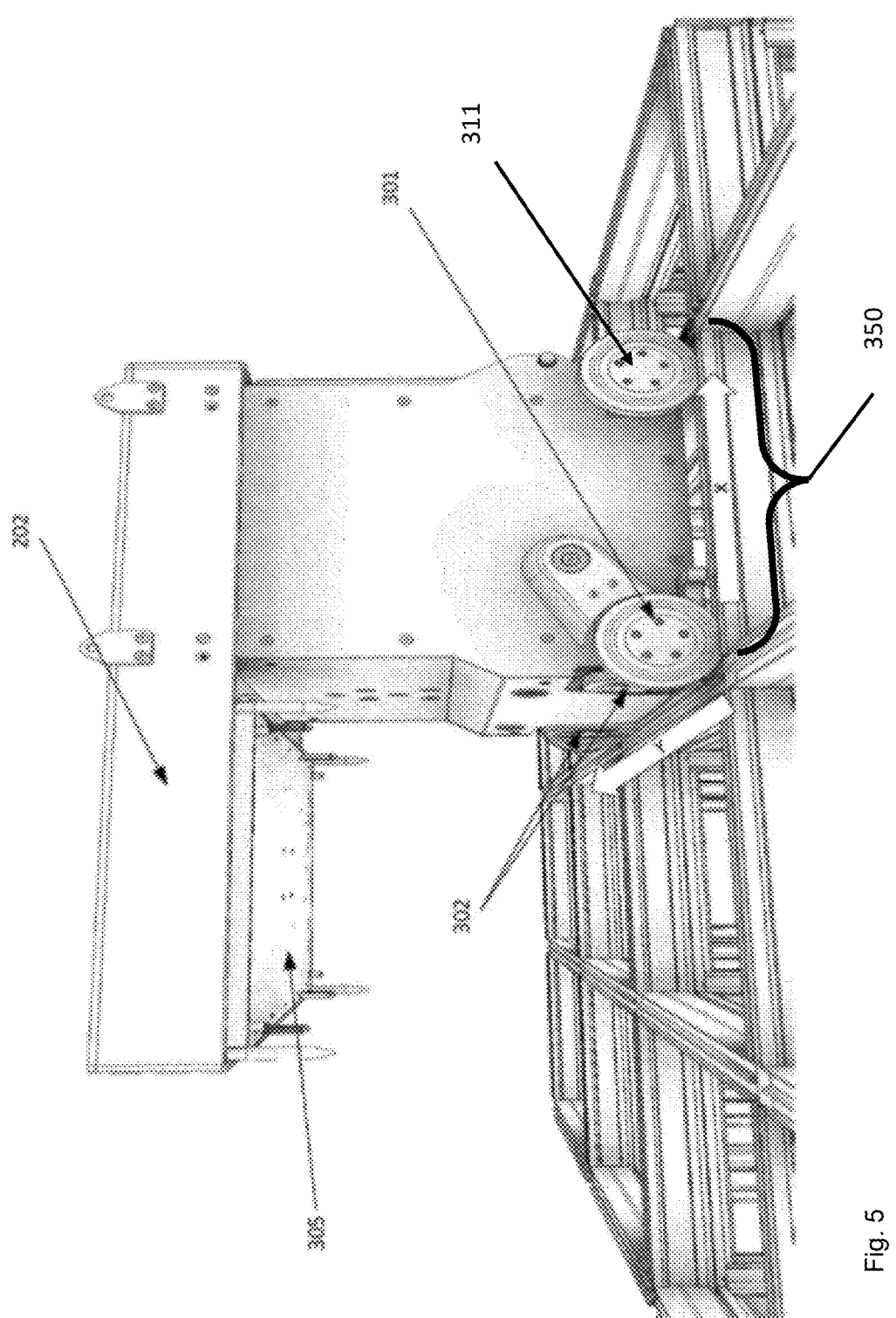
FIG. 5 is a perspective drawing of an embodiment of the present invention indicating the wheels effected by the invention.

FIGS. 4 and 5 are perspective drawings of an embodiment of the present invention showing the container handling vehicle positioned on the storage and retrieval system and wherein the X- and Y-directions is indicated. The first set of wheels in the Y-direction 302 is positioned in the inner tracks. In this drawing both the wheels in the X-direction and in the Y-direction are displayed lowered down and positioned in the inner tracks. The wheels in the Y-direction can be raised and lowered in order to enable the container handling vehicle to switch between direction of movement. When the container handling vehicle is to shift from movement in on direction to another, the Y-direction is lowered all the way down pushing the container handling vehicle up so both sets of wheels in the X-direction are above the tracks of the storage and retrieval system.

Both front wheels in the X-direction 301 can be extended forward in order to ensure better stability when the container handling vehicle is carrying a container. The drive medium of these wheels can be a splined shaft engaging with a belt or a chain transferring torque from the splined shaft to the wheels.

Figure 6:
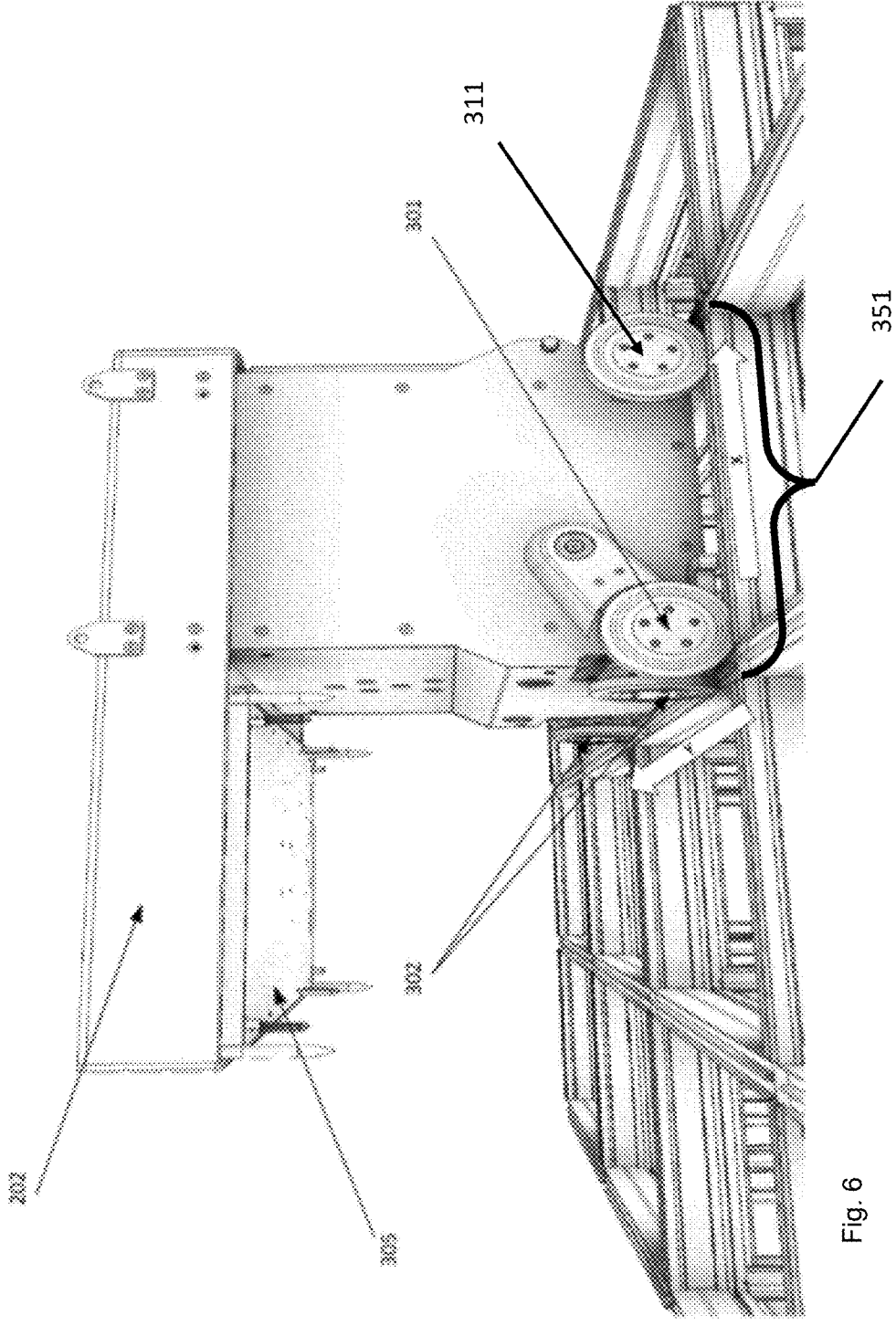
FIG. 6 is a perspective drawing where the wheels for manoeuvring the container handling vehicle in a Y-direction on the cantilever side of the container handling vehicle is extended in the X-direction.
Figure 7:
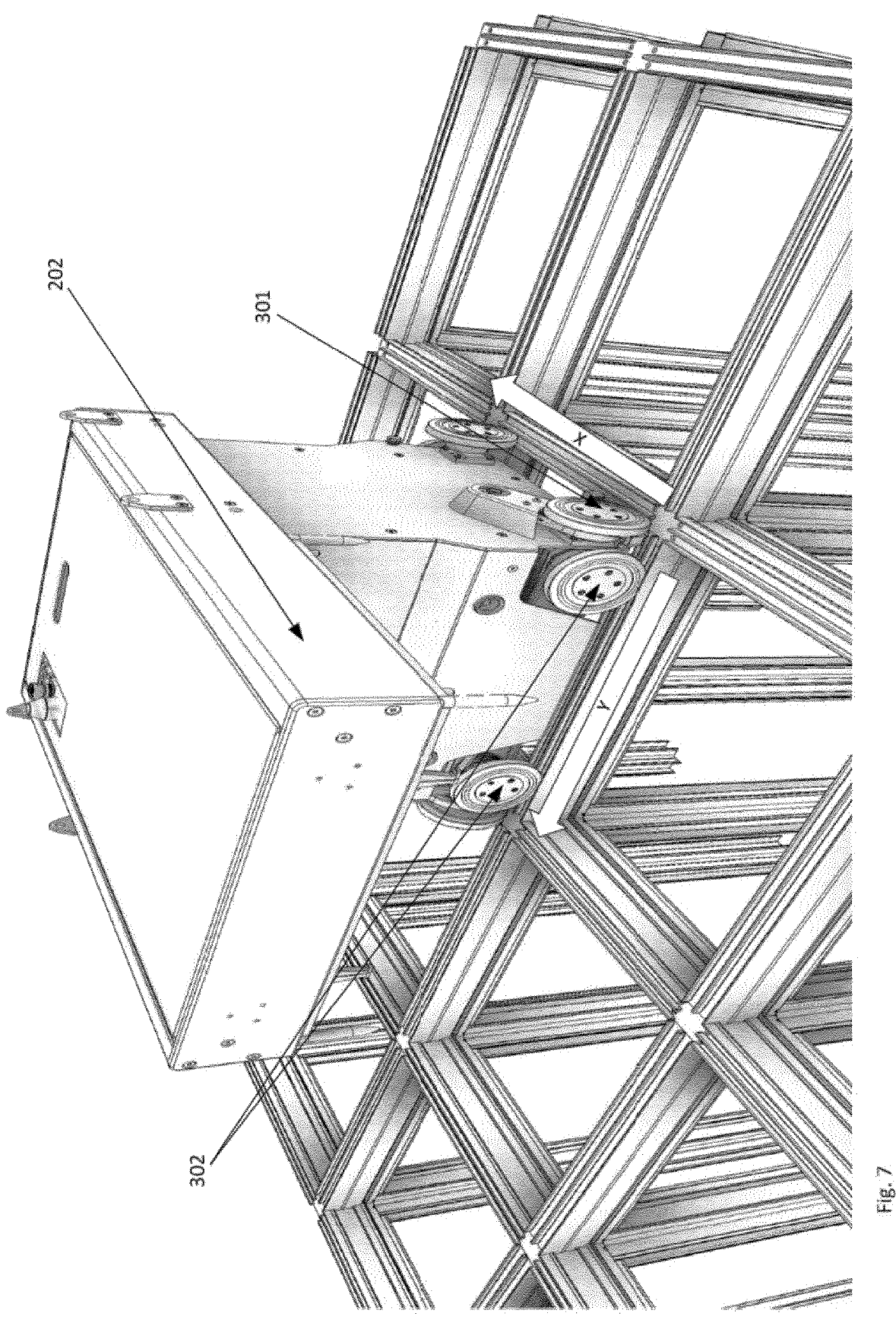
FIG. 7 is a perspective drawing where the wheels for manoeuvring the container handling vehicle in a Y-direction on the cantilever side of the container handling vehicle is extended in the X-direction.
Figure 8:
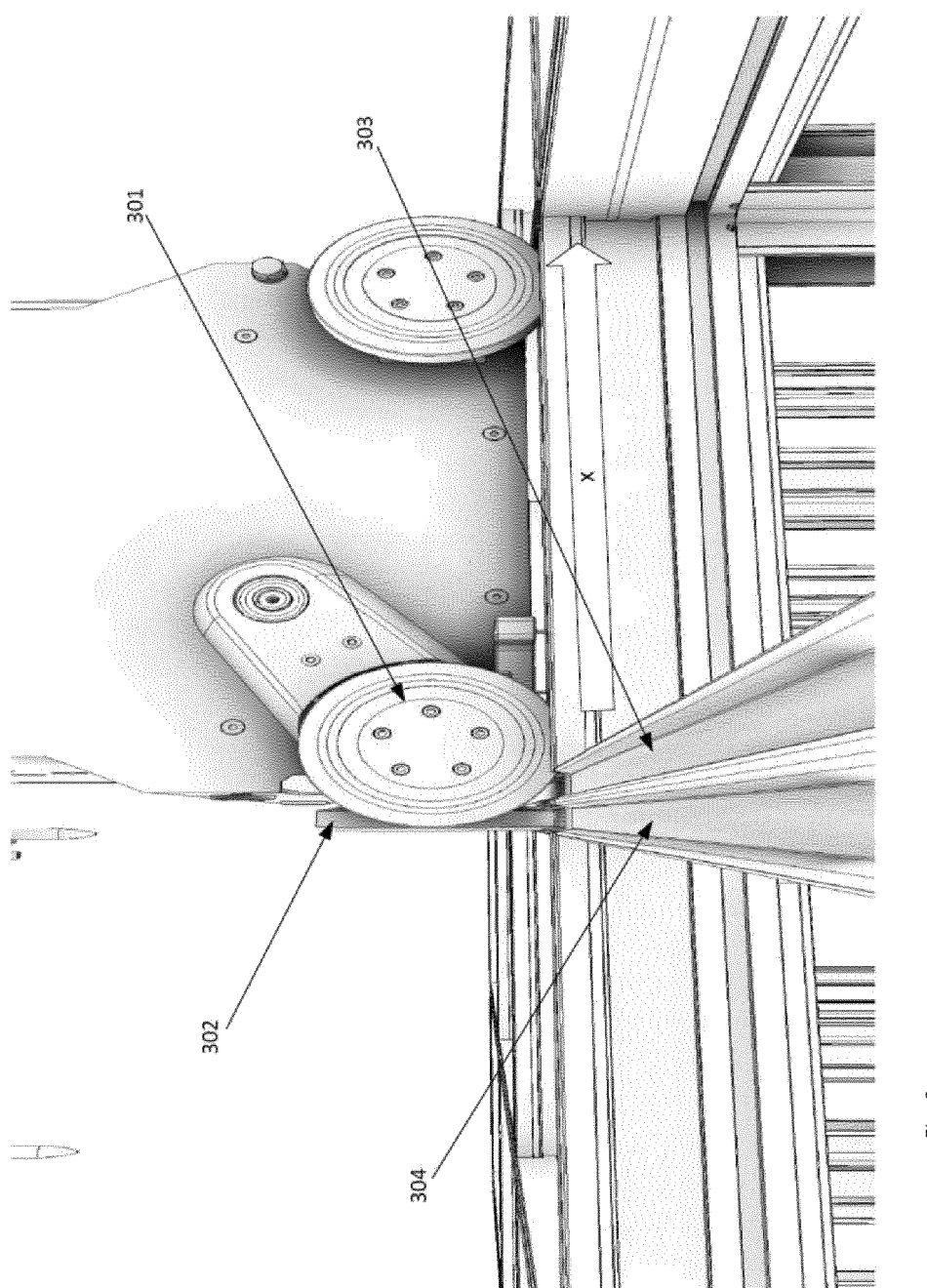
FIG. 8 is a close-up perspective drawing of the extended wheels.

FIGS. 6, 7 and 8 are perspective drawings where the first set of wheels for manoeuvring the container handling vehicle in a Y-direction 302, is extended so that they are positioned in the outer tracks 304 furthest from the main body of the container handling vehicle.

As shown the front wheels for manoeuvring in the Y-direction is engaging with the outer tracks while the back wheels for manoeuvring in the Y-direction is engaging with the inner tracks. This ensures that two container handling vehicles can pass each other using the same rail while still ensuring good stability while carrying a container.

In a preferred embodiment of the present invention the extension of the wheels 302 can be permanent wherein they will always engage with the outer tracks.

In an alternative embodiment of the present invention the wheels 302 can be extended or contracted using e.g. an electric motor driving a rack and pinion system for extending the wheels 302 when needed. This allows the wheels 302 to use both the inner and the outer tracks when necessary.

In yet another solution there can be a double set of wheels 302 so that they engage with both the inner 303 and the outer 304 tracks at the same time. This gives a higher stability and better distribution of load, but it also results in more friction during manoeuvring.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior art (FIGS. 1-4):
1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)

112 Access opening
119 First port column
120 Second port column
201 Prior art cantilever storage container vehicle
201a Vehicle body of the storage container vehicle 301
201b Drive means in first direction (X)
201c Drive means in second direction (Y)
202 Cantilever
301 Extendable wheels for manoeuvring in X-direction
302 Front wheels for manoeuvring in Y-direction
303 Inner tracks
304 Outer tracks.
500 Control system
X First direction
Y Second direction
Z Third direction

The invention claimed is:

1. A container handling vehicle with a cantilever for operating on an automated storage and retrieval system comprising a framework structure forming a three-dimensional storage grid structure for storing storage containers for storing items, the container handling vehicle occupying a footprint of more than one cell on the grid structure, wherein the grid structure forms vertical storage columns each having a horizontal area defined by the size of an access opening of the vertical storage columns and wherein a rail system is arranged on the framework structure, rails of the rail system extending in an X-direction and a Y-direction to define a grid and to define a perimeter of each access opening on top of each storage column, the rail system providing available routes for container handling vehicles handling and transferring the storage containers to and from the storage columns, each rail of the rail system has a first track and a parallel second track allowing two container handling vehicles to pass each other using the first track and the parallel second track, the container handling vehicle having a vehicle controller for communicating with a central computer system controlling the container handling vehicle, and the container handling vehicle has a container handling platform with a set of grippers for handling the storage containers,
    wherein a first pair of wheels on a cantilever side of the container handling vehicle, used for manoeuvring the container handling vehicle in the Y-direction, are positioned or are positionable with respect to the container handling vehicle to allow the first pair of wheels to use an outer track of a first rail of the rail system in the Y-direction to manoeuvre the container handling vehicle when a second pair of wheels on an opposite side of the container handling vehicle are using an inner track of an adjacent rail in the Y-direction, wherein the opposite side of the container handling vehicle is opposite the cantilever side, wherein the first pair of wheels on the cantilever side of the container handling vehicle are positioned with respect to the container handling vehicle to provide an extension of a wheelbase of the container handling vehicle in the X-direction.

2. A container handling vehicle according to claim 1, wherein a third pair of wheels adjacent to the cantilever side of the container handling vehicle that are used for manoeuvring the container handling vehicle in a X-direction are displaceable in the X-direction to provide an extension of a wheelbase in the X-direction, wherein the third pair of wheels and a fourth pair of wheels are arranged perpendicular to the cantilever side.

3. A container handling vehicle according to claim 1, wherein the first pair of wheels on the cantilever side of the container handling vehicle that are used for manoeuvring the container handling vehicle in a Y-direction are positioned in an extended wheelbase position while the container handling vehicle is set to manoeuvre in a X-direction.

4. A container handling vehicle according to claim 1, wherein the first pair of wheels on the cantilever side of the container handling vehicle that are used for manoeuvring the container handling vehicle in a Y-direction are each provided with a respective double set of wheels on a respective axel.

5. A container handling vehicle according to claim 4, wherein each respective double set of wheels of the first pair of wheels has one wheel in each of the outer track of the first rail and an inner track of the first rail.

6. A container handling vehicle according to claim 2, wherein the first pair of wheels and/or the third pair of wheels are configured with means for extension of the wheelbase.

7. A container handling vehicle according to claim 6, wherein the first pair of wheels and/or the third pair of wheels are configured with means for extension of the wheelbase is controlled according to a weight of the container attached to a lifting platform of the container handling vehicle.

8. A container handling vehicle according to claim 7, wherein the first pair of wheels and/or the third pair of wheels are configured with means for extension of the wheelbase is controlled by the central computer system.

9. A method where a container handling vehicle with a cantilever operating on an automated storage and retrieval system comprising:
    a framework structure forming a three-dimensional storage grid structure for storing storage containers for storing items,
    the container handling vehicle occupying a footprint of more than one cell on the grid structure
    wherein the grid structure forms vertical storage columns each having same horizontal area defined by the size of an access opening of the vertical storage columns and
    wherein a rail system is arranged on the framework structure,
    rails of the rail system extending in an X-direction and a Y-direction to define a grid and to define a perimeter of each access opening on top of each storage column,
    the rail system providing available routes for container handling vehicles handling and transferring the storage containers to and from the storage columns,
    each rail of the rail system has a first track and a parallel second track allowing two container handling vehicles to pass each other using the first track and the parallel second track,
    the container handling vehicle comprising a vehicle controller for performing:
    communicating with a central computer system controlling the container handling vehicle, wherein
    the container handling vehicle has a container handling platform with a set of grippers for handling the storage containers, and
    positioning a first pair of wheels on a cantilever side of the container handling vehicle that are used for manoeuvring the container handling vehicle in the Y-direction with respect to the container handling vehicle to allow the first pair of wheels to use a second track of a first rail of the rail system in the Y-direction to manoeuvre the container handling vehicle when a second pair of wheels on an opposite side of the container handling vehicle are using a first track of an adjacent rail in the Y-direction, wherein the opposite side of the container handling vehicle is opposite the cantilever side.

10. A method according to claim 9 wherein the method comprises:

lowering a third pair of wheels and a fourth pair of wheels used for manoeuvring the container handling vehicle in a X-direction lifting the container handling vehicle so the first pair of wheels used for manoeuvring the container handling vehicle in a Y-direction are lifted from the first track of the first rail of the rail system, repositioning the first pair of wheels on a cantilever side of the container handling vehicle that are used for manoeuvring the container handling vehicle in a Y-direction, raising the third pair of wheels adjacent the cantilever side of the container handling vehicle that are used for manoeuvring the container handling vehicle in a X-direction.

\* \* \* \* \*